United States Patent
Macwan et al.

(10) Patent No.: US 8,397,298 B2
(45) Date of Patent: Mar. 12, 2013

(54) METHOD AND SYSTEM FOR CONTENT DISTRIBUTION NETWORK SECURITY

(75) Inventors: Sanjay Macwan, Marlboro, NJ (US); Deepak K. Chawla, Ocean, NJ (US); Gustavo de los Reyes, Fair Haven, NJ (US); Cristina Serban, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 520 days.

(21) Appl. No.: 12/632,966

(22) Filed: Dec. 8, 2009

(65) Prior Publication Data
US 2011/0138467 A1  Jun. 9, 2011

(51) Int. Cl.
*G06F 21/00* (2006.01)

(52) U.S. Cl. ............. 726/24; 726/23; 713/187; 713/188

(58) Field of Classification Search ............... 726/23; 713/187–188
See application file for complete search history.

(56) References Cited

U.S. PATENT DOCUMENTS

| | | | |
|---|---|---|---|
| 5,864,659 A | 1/1999 | Kini | |
| 5,958,010 A | 9/1999 | Agarwal et al. | |
| 6,286,001 B1 | 9/2001 | Walker et al. | |
| 6,711,687 B1 | 3/2004 | Sekiguchi | |
| 6,769,061 B1 | 7/2004 | Ahern | |
| 7,181,523 B2 | 2/2007 | Sim | |
| 7,231,442 B2 | 6/2007 | Chen | |
| 2003/0135509 A1 | 7/2003 | Davis et al. | |
| 2004/0019781 A1* | 1/2004 | Chari et al. | 713/153 |
| 2004/0083283 A1 | 4/2004 | Sundaram et al. | |
| 2005/0021706 A1 | 1/2005 | Maggi et al. | |
| 2006/0075139 A1* | 4/2006 | Jungck | 709/245 |
| 2006/0282891 A1* | 12/2006 | Pasko | 726/23 |

* cited by examiner

*Primary Examiner* — David García Cervetti
*Assistant Examiner* — Ghazal Shehni
(74) *Attorney, Agent, or Firm* — Akerman Senterfitt; Michael K. Dixon; Roy Zachariah

(57) ABSTRACT

A content delivery system includes an upload module, a content delivery module, and a monitoring module. The upload module is configured to receive content from a content provider, detect content containing malicious software or proprietary information, and provide information about the content to a monitoring module. The content delivery module is configured to detect content containing malicious software or unauthorized changes, detect operational changes to the content delivery module, provide information about the content and the operational changes to the monitoring module, receive a request for the content from a client system, and provide the content to the client system. The monitoring module is configured to monitor a network for potentially malicious traffic, receive information from the content delivery module and the upload module, correlate the information and the potentially malicious traffic to identify a security event, and trigger a response to the security event.

20 Claims, 5 Drawing Sheets

METHOD AND SYSTEM FOR CONTENT DISTRIBUTION NETWORK SECURITY

FIELD OF THE DISCLOSURE

The present disclosure generally relates to communications networks, and more particularly relates to a method and system for Content Distribution Network (CDN) security.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to an edge server situated closer to the client issuing the request. CDNs either co-locate edge servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
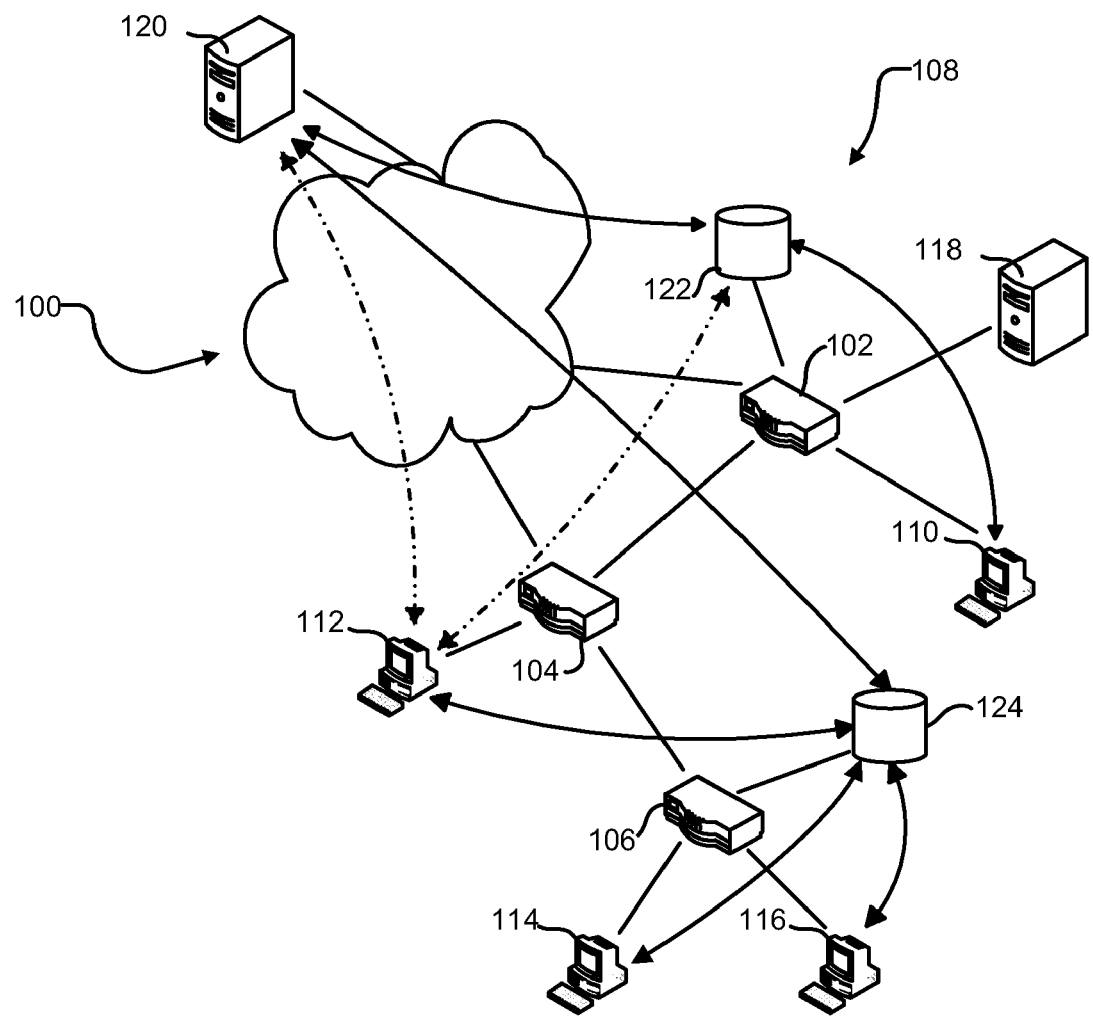
FIG. 1 is a diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other as that fond network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include edge servers 122 and 124 replicating content on the server 120 that can be located more closely within the network to the client systems 110, 112, 114, and 116. Edge server 122 can link to router 102, and edge server 124 can link to router 106. Client systems 110, 112, 114, and 116 can be assigned edge server 122 or 124 to decrease the time needed to retrieve information, such as by selecting the edge server closer to the particular client system. The network distance between an edge server and client system can be determined by network cost and access time. As such, the effective network distance between the edge server and the client system may be different from the geographic distance.

When assigning edge servers 122 and 124 to client systems 110 through 116, the edge server closest to the client can be selected. The closest edge server may be the edge server having a shortest network distance, a lowest network cost, a lowest network latency, a highest link capacity, or any combination thereof. Client system 110 can be assigned edge server 122, and client systems 114 and 116 can be assigned to edge server 124. The network costs of assigning client system 112 to either of edge server 122 or 124 may be substantially identical. When the network costs associated with the link between router 102 and router 104 are marginally lower than the network costs associated with the link between router 104 and router 106, client 112 may be assigned to edge server 124.

Client system 112 may send a request for information to edge server 124. If edge server 124 has the information stored in a cache, it can provide the information to client system 112. This can decrease the distance the information travels and reduce the time to retrieve the information. Alternatively, when edge server 124 does not have the information, it can retrieve the information from server 120 prior to providing the information to the client system 112. In an embodiment, edge server 124 may attempt to retrieve the information from edge server 122 prior to retrieving the information from server 120. The edge server 124 may retrieve the information from the server 120 only once, reducing the load on server 120 and network 100 such as, for example, when client system 114 requests the same information.

Edge server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost savings and time savings of providing content from the cache, the most popular content may be stored in the cache, while less popular content is retrieved from server 120.

In an embodiment, network problems may prevent the propagation of content through the CDN, resulting in a user receiving incomplete or stale content. For example, an edge server may not be able to retrieve content from another edge server or from an origin server. In another example, the edge server providing the content to the user may not be aware that a new version of the content is available, resulting in stale content being provided to the user. It is desirable to identify and correct problems impacting the user experience relatively quickly in order to minimize the number of users affected.

Figure 2:
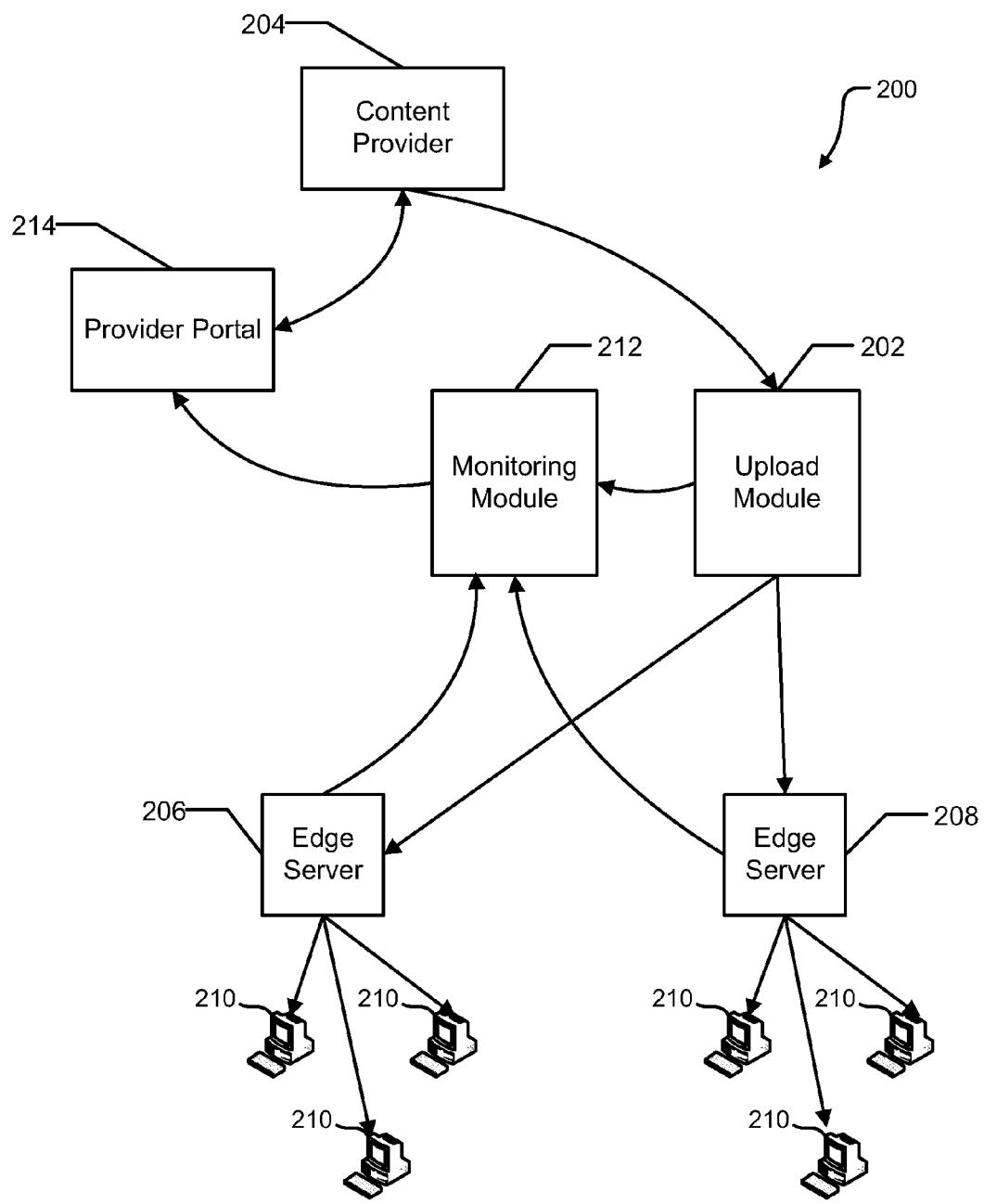
FIG. 2 is block diagram illustrating a content delivery system in accordance with an embodiment of the present disclosure.

FIG. 2 illustrates a content delivery system 200 that can be used in conjunction with communications network 100. The content delivery system 200 can include an upload module 202 for receiving content from a content provider 204. The upload module 202 can include a plurality of geographically dispersed storage systems for storing the content within content delivery system 200. The use of multiple geographically dispersed storage systems for storing the content can substantially reduce the likelihood that the content becomes lost or inaccessible. The upload module 202 can generate a unique identifier for the content and generate a hash of the content to ensure the content is not altered within content delivery system 200. Additionally, the upload module 202 can analyze the content to determine if the content includes malicious software, such as computer viruses, Trojan horses, worms, spyware, and the like. By analyzing the content for malicious software, the upload module can substantially prevent accidental or malicious spreading of malicious software to users accessing the content.

In an embodiment, the upload module 202 can detect certain types of data leaks by analyzing the content to determine if the content contains certain proprietary information. For example, the upload module 202 can detect if the content contains a portion of a customer database including personal or proprietary customer information. The customer information includes account information, financial information, contact information, and other personal information, such as medical histories. Examples of account information include usernames and passwords for customer accounts, order histories, and the like. Examples of financial information include credit card numbers, bank account numbers, and the like. Examples of contact information include addresses, phone numbers, email addresses, and the like. By analyzing the content for proprietary information, the upload module 202 can substantially prevent accidental or malicious release of the proprietary or personal information.

The content delivery system can further include edge servers 206 and 208. Edge servers 206 and 208 can retrieve the content from the upload module 202 and provide the content upon request to users 210. The content can be retrieved by the edge servers 206 and 208 from upload module 202 upon request by a user 210, or the content can be pushed to the edge servers 206 and 208 from the upload module 202 prior to a request for the content from the user.

In an embodiment, edge servers 206 and 208 can verify the integrity of the content by comparing a hash of the content as received by the edge server 206 or 208 to the hash of the content as received by the upload module 202 from content provider 204. By comparing the hashes, edge servers 206 and 208 can detect if the content has been modified within the content delivery system 200. Additionally, edge servers 206 and 208 may analyze the content for malicious software as a further layer of protection from spreading malicious software to users 210.

Content delivery system 200 can further include monitoring module 212 and provider portal 214. Monitoring module 212 can receive information from upload module 202 and edge servers 206 and 208. The information can include operational data including the time content was uploaded, the size of the content, the number of users 210 downloading the content from each edge servers 206 and 208, the load on edge servers 206 and 208, and the like. Additionally, the information can include security data, including system logs, configuration information, system information, and the like. The configuration information can include the size of configuration files, last modification times of the configuration files, recent changes to the configuration files, or any combination thereof. System information can include CPU utilization, bandwidth utilization, storage utilization, number of concurrent connections, processor temperature, fan speed, drive status such as Self Monitoring Analysis and Reporting Technology (S.M.A.R.T.) information, other indicators of the current operation of the content server, or any combination thereof.

In an embodiment, upload module 202 can notify monitoring module 212 when malicious software or proprietary information is detected within the content and edge servers 206 and 208 can notify monitoring module 212 when changes to the content are detected. Provider portal can provide content provider 204 with access to the information, such as in reports summarizing the usage information and detection events.

Figure 3:
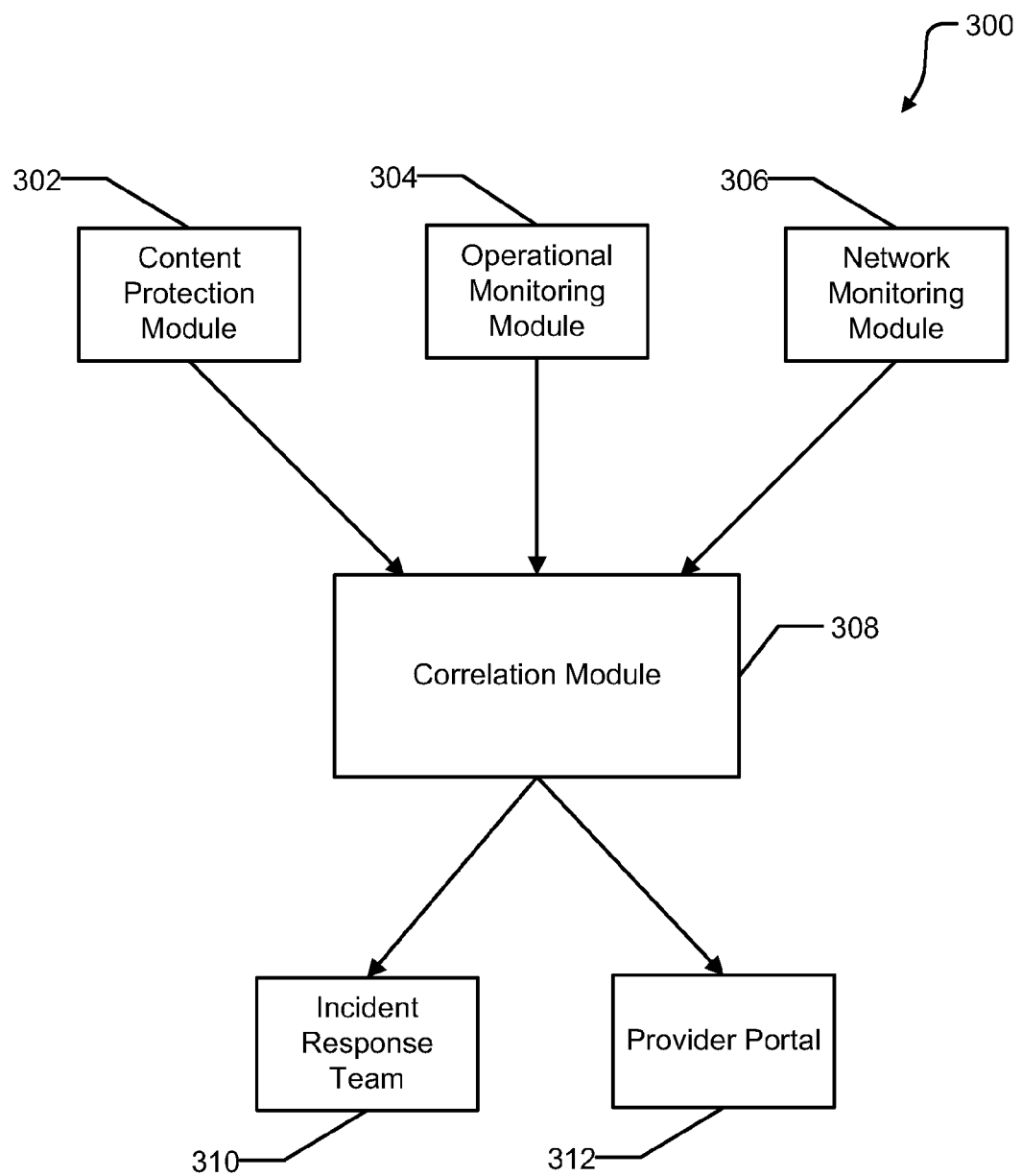
FIG. 3 is block diagram illustrating an exemplary monitoring system in accordance with an embodiment of the present disclosure.

FIG. 3 illustrates a monitoring system 300 that can be used in conjunction with content distribution system 200. Monitoring system 300 can include a content protection module 302, an operational monitoring module 304, and a network monitoring module 306. Each of content protection module 302, operational monitoring module 304, and network monitoring module 306 can report information to a correlation module 308. The correlation module 308 can utilize the information to identify problems within a content delivery system.

The content protection module 302 can monitor content as it is uploaded or just prior to delivery to users. The content protection module 302 can detect data leaks, unauthorized alterations to the content, and malicious software within the content. Additionally, the content protection module 302 can provide quality assurance for delivery of the content. For example, the content protection module 302 can monitor delivery of streaming multimedia content to determine if the quality of the multimedia experience is acceptable. To achieve this, the content protection module 302 may monitor transmission rates, packet error rates, disconnects, and the like and correlate them.

Operational monitoring module 304 can monitor the operation of various systems, such as edge nodes and storage systems, within the content delivery system. The operational monitoring module 304 can monitor operational data and security data to identify operational anomalies, such as rapid increases in activity at an edge node. Rapid increases in activity at the edge node can be the result of a flash crowd when content rapidly becomes very popular among users, or can be the result of an attack, such as a distributed denial of service (DDoS) attack. The operational monitoring module 304 can also identify intrusion attempts, component failures, system failures, and the like.

Network monitoring module 306 can monitor network traffic to identify anomalous traffic. Anomalous traffic can include malicious traffic, such as traffic associated with malicious software, network intrusions, and network attacks such as DDoS attacks.

Correlation module 308 can correlate the information from content protection module 302, operational monitoring module 304, and network monitoring module 306 to identify security events. Correlating information from multiple sources can reduce the number of false positives when identifying security events. For example, an increase in the number of requests received by a cache server could be related to a flash crowd or to a DDoS attack. When combined, the information from the operations monitoring module and from the network monitoring module can be used to distinguish between a flash crowd and a DDoS attack. Specifically, DDoS attacks typically initiate a large number of requests for content without waiting to receive the content whereas flash crowds initiate requests to receive content. As such, DDoS attacks may manifest as a large number of requests with a relatively small amount of data transferred. In contrast, a flash crowd can manifest as a large number of requests with a relatively large amount of data transferred. Combining the information from the operational monitoring module, such as frequency of requests and number of concurrent connections, and information from the network monitoring module, such as the amount of data transferred, the system can identify a flash crowd as a normal operational event while identifying a DDoS attack as a security event. In another example, increased traffic associated with malicious software may provide an early warning of an increased likelihood of receiving malicious software-containing content from a content provider.

When a security event is identified, the correlation module 308 can trigger a response to the event. Depending on the type of security event, the response may include sending a notification to an incident response team 310, notifying the content provider through provider portal 312, increasing logging of events on the network or at various systems within the network, or initiating automatic attack mitigation procedures. Automatic attack mitigation procedures can include network based procedures and server based procedures.

The various modules discussed above can be implemented in hardware, software, or any combination thereof. Each module may include one or more computer systems. When a module includes more than one computer system, the functions of the module can be distributed across the multiple computer systems in a symmetric manner that is each computer system performs the same type of tasks, or in an asymmetric manner that is two computer systems of the module may perform different tasks.

Figure 4:
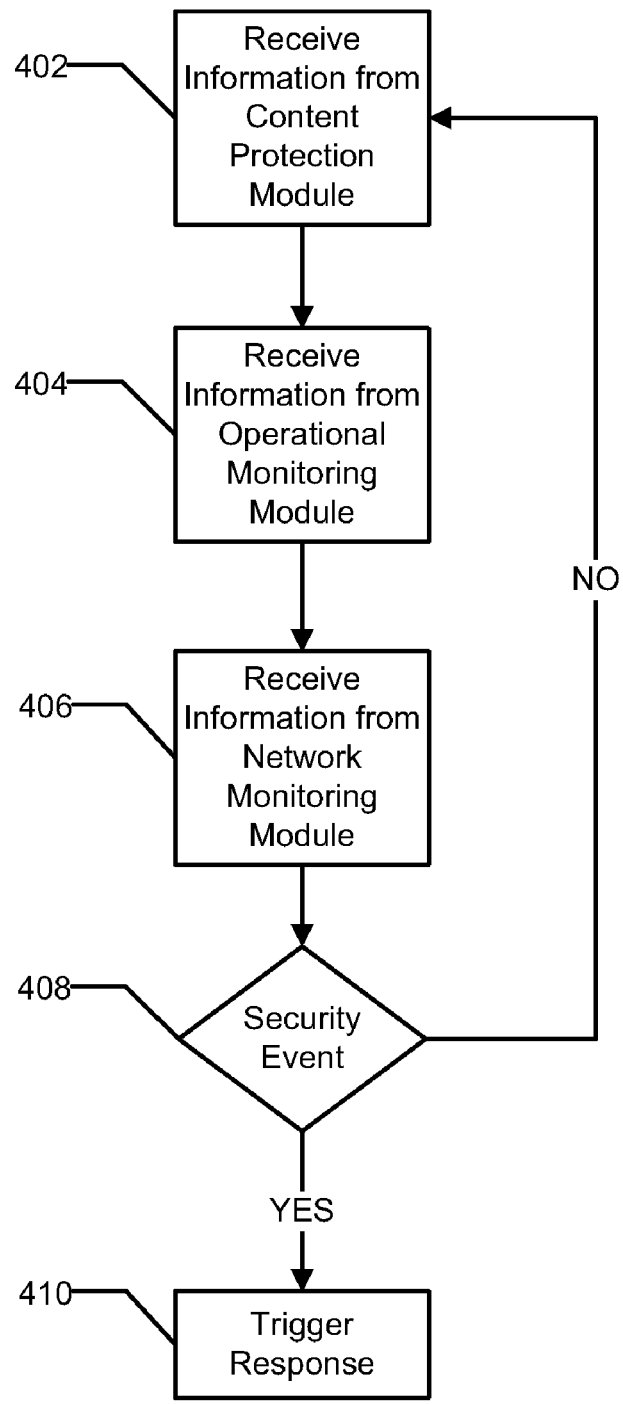
FIG. 4 is a flow diagram illustrating a method of monitoring a content delivery system.

FIG. 4 illustrates a method of monitoring a content distribution system, such as content distribution system 200. At 402, a system, such as the correlation module, can receive information from a content protection module. The information from the content protection module can include information about malicious software found within the content, a potential data leak, or unauthorized changes made to the content.

At 404, the system can receive information from an operational monitoring module. The information from the operational monitoring module can include information about the performance of systems within the content distribution system, such as edge servers. The information can include status information, such as the load on an edge server, the number of requests being served, the amount of available bandwidth, and the like. Additionally, the information can include information about requests for content, such as the number of incoming requests for the content, the geographic distribution of the users sending the requests, and the like. The operational monitoring module can also provide information about attempted intrusions and configuration changes. This information can be useful for identifying direct attacks on components of the content distribution system.

At 406, the system can receive information from a network monitoring module. The information from the network monitoring module can include information about network traffic. For example, the network monitoring module can provide information about the amount of available bandwidth currently being used on various network links. Additionally, the network monitoring module can provide information about anomalous traffic, such as traffic associated with malicious software, network intrusions, and network attacks.

At 408, the system can determine if a security event has occurred. The system can correlate the information for the content protection module, the operational monitoring module, and the network monitoring module to identify a security event. If a security event has occurred, the system can trigger a response. Depending on the type of security event, the response may include sending a notification to an incident response team, notifying the content provider through provider portal, increasing logging of events on the network or at various systems within the network, or initiating automatic attack mitigation procedures. Otherwise, the system can receive additional information from the content protection module at 402.

Figure 5:
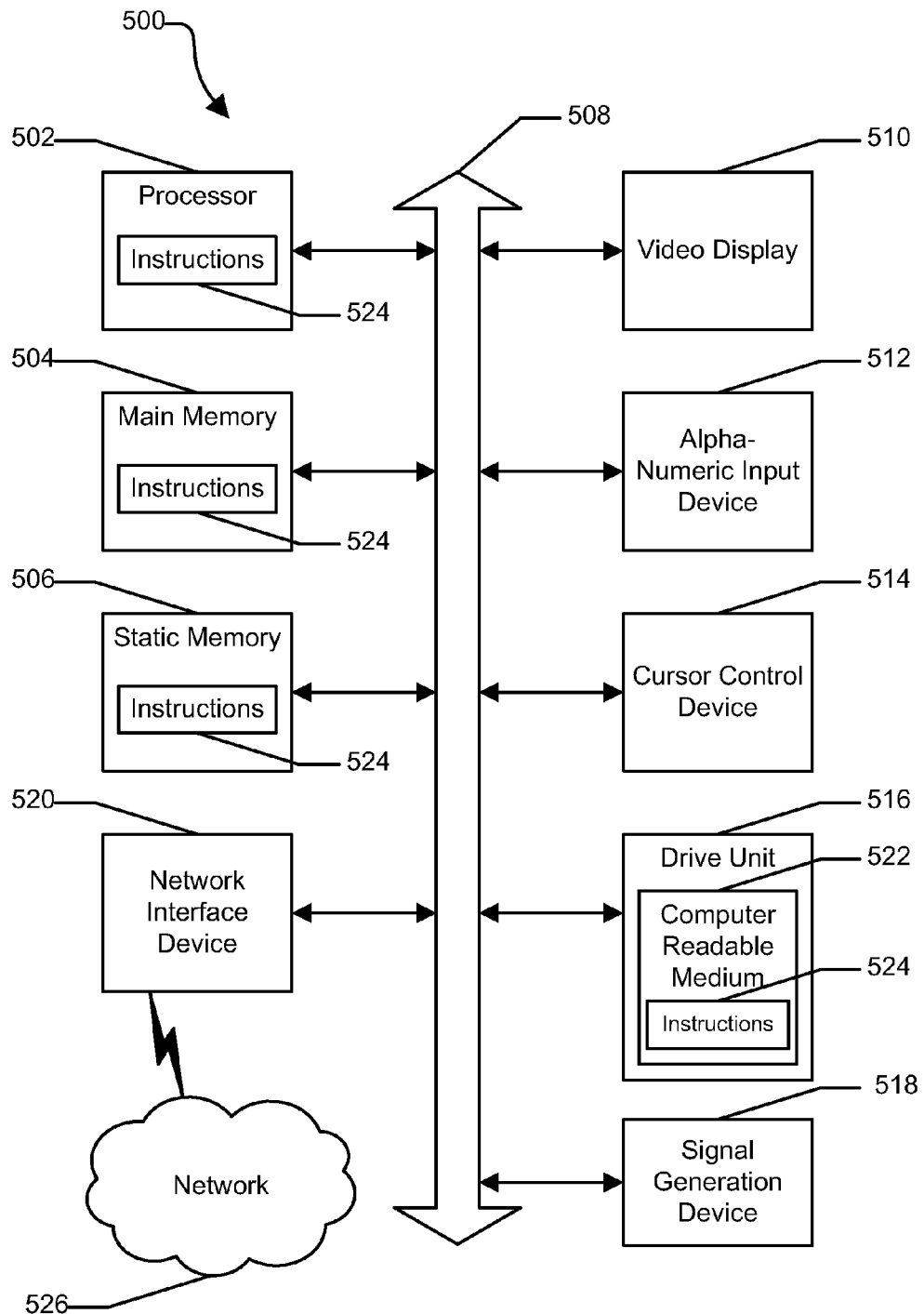
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content delivery system comprising:
an upload module configured to:
receive content from a content provider;
generate a first hash of the content
detect that the content contains at least one of malicious software and proprietary information; and
provide information about the content to a monitoring module;
a hardware content delivery module configured to:
receive the content from the upload module;
generate a second hash of the content;
verify the integrity of the content based upon the first hash and the second hash;
detect that the content contains at least one of malicious software and unauthorized changes;
detect operational changes to the content delivery module;
provide information about the content and the operational changes to the monitoring module;
receive a request for the content from a client system; and
provide the content to the client system; and
the monitoring module configured to:
monitor a network for potentially malicious traffic;
receive information from the content delivery module and the upload module, the information from the content delivery module including verification of the integrity of the content;
correlate the information and the potentially malicious traffic to identify a security event; and
trigger a response to the security event.

2. The content delivery system of claim 1, wherein the proprietary information includes customer information.

3. The content delivery system of claim 1, wherein the malicious software includes at least one of computer viruses, Trojan horses, worms, and spy ware.

4. The content delivery system of claim 1, wherein the malicious traffic includes at least one of malicious software related traffic, denial of service attacks, and network intrusions.

5. The content delivery system of claim 1, wherein the response includes at least one of initiation of an attack mitigation procedure, notification of a response team, notification of the content provider, and increased logging of events in at least one of the network, the content delivery module, and the upload module.

6. The content delivery system of claim 5, wherein the attack mitigation procedure is performed by the content delivery module.

7. The content delivery system of claim 1, wherein monitoring module is further configured to provide quality assurance for delivery of the content.

8. A security system for a content delivery network, comprising:
a hardware content protection module configured to:
  detect content containing at least one of malicious software and proprietary information;
  detect unauthorized changes to content by comparing a first hash of the content as received by an upload module of the content delivery network with a second hash of the content as received by a content delivery module of the content delivery network; and
  provide information about the content to a correlation module;
an operational monitoring module configured to:
  detect operational changes within the content delivery network; and
  provide information about the operational changes to the correlation module;
a network monitoring module configured to:
  monitor traffic for increased malicious activity; and
  provide information about the increased malicious activity to the correlation module; and
the correlation module configured to:
  receive information from the content protection module, the operational monitoring module, and the network monitoring module;
  identify a security event based on the information; and
  trigger a response to the security event.

9. The security system of claim 8, wherein the proprietary information includes customer information.

10. The security system of claim 8, wherein the malicious software includes at least one of computer viruses, Trojan horses, worms, and spy ware.

11. The security system of claim 8, wherein the malicious activity includes at least one of malicious software related traffic, denial of service attacks, and network intrusions.

12. The security system of claim 8, wherein the response includes at least one of initiation of an attack mitigation procedure, notification of a response team, notification of the content provider, and increased logging of events by at least one of the content protection module, the operations monitoring module, and the network monitoring module.

13. The security system of claim 12, wherein the attack mitigation procedure is performed by the content delivery module.

14. The security system of claim 8, wherein the content protection module is further configured to provide quality assurance for delivery of the content.

15. A computer implemented method for providing security to a content delivery network operating through a communications network, comprising:
detecting content containing malicious software;
detecting unauthorized changes to content by comparing a first hash of the content as received by an upload module of the content delivery network with a second hash of the content as received by a content delivery module of the content delivery network;
monitoring operational changes within the content delivery network;
identifying increased malicious activity within the communications network; and
identifying a security event based on at least one of detecting content containing malicious software, detecting unauthorized changes to content, monitoring operation changes, and identifying increase malicious activity; and
triggering a response to the security event.

16. The method of claim 15, wherein the response includes at least one of initiation of an attack mitigation procedure, notification of a response team, notification of the content provider, and increased logging of events in the content delivery network.

17. The method of claim 16, wherein the attack mitigation procedure is performed by the content delivery module.

18. The method of claim 15, wherein the malicious software includes at least one of computer viruses, Trojan horses, worms, and spy ware.

19. The method of claim 15, wherein the malicious activity includes at least one of malicious software related traffic, denial of service attacks, and network intrusions.

20. The method of claim 15, further comprising monitoring delivery of streaming multimedia content to provide quality assurance.

* * * * *